United States Patent
Yuan et al.

(10) Patent No.: US 9,934,200 B1
(45) Date of Patent: Apr. 3, 2018

(54) METHOD AND SYSTEM FOR IMPLEMENTING DYNAMIC NOTE FORMATTING AND DISPLAY

(71) Applicants: Sheue S. Yuan, Moorestown, NJ (US); Grae Cullen, Ewing, NJ (US)

(72) Inventors: Sheue S. Yuan, Moorestown, NJ (US); Grae Cullen, Ewing, NJ (US)

(73) Assignee: CA, Inc., New York, NY (US)

( * ) Notice: Subject to any disclaimer, the term of this patent is extended or adjusted under 35 U.S.C. 154(b) by 333 days.

(21) Appl. No.: 13/781,002

(22) Filed: Feb. 28, 2013

(51) Int. Cl.
G06F 17/21 (2006.01)

(52) U.S. Cl.
CPC .................. *G06F 17/211* (2013.01)

(58) Field of Classification Search
CPC .... G06F 12/24; G06F 17/60; G06F 17/30725; G06F 9/44; G06F 17/21; G06F 17/211
USPC .............. 715/243; 705/51; 713/200
See application file for complete search history.

(56) References Cited

U.S. PATENT DOCUMENTS

| | | | | |
|---|---|---|---|---|
| 6,154,757 | A * | 11/2000 | Krause ................. | G06F 3/0219 715/205 |
| 7,032,030 | B1 * | 4/2006 | Codignotto ......... | G06Q 10/107 707/999.01 |
| 7,392,484 | B1 * | 6/2008 | Garfinkel ............. | G06F 17/21 707/999.003 |
| 2002/0035697 | A1 * | 3/2002 | McCurdy et al. ............ | 713/200 |
| 2002/0080186 | A1 * | 6/2002 | Frederiksen .......... | G06F 3/0362 715/808 |
| 2002/0095657 | A1 * | 7/2002 | Vaidyanathan et al. ...... | 717/110 |
| 2005/0273363 | A1 * | 12/2005 | Lipscher ................ | G06Q 50/22 705/2 |
| 2006/0036996 | A1 * | 2/2006 | Low .......................... | G06F 8/20 717/113 |
| 2006/0101328 | A1 * | 5/2006 | Albornoz ............... | G06Q 10/10 715/201 |
| 2006/0143559 | A1 * | 6/2006 | Spielberg ............... | G06F 3/165 715/201 |
| 2007/0283273 | A1 * | 12/2007 | Woods .............. | G06F 17/30861 715/738 |
| 2010/0313114 | A1 * | 12/2010 | Colbran ....................... | 715/230 |

OTHER PUBLICATIONS

Using Adobe Acrobat 9 Pro, last updated Sep. 30, 2011 http://help.adobe.com/archive/en_US/acrobat/9/professional/acrobat_pro_9.0_help.pdf.*
Acrobat9_tooltip_box_screenshot.pdf, last update Sep. 30, 2011.* acrobat9_tooltip_box_screen_shot.pdf.*
Acrobat9_tooltip_box_screenshot.pdf, copyright, 1984-2010 Adobe Systems Inc.*
Updated acrobat9_tooltip_box_screen_shot'053106.pdf.*
Zon, "JavaScript, DHTML Tooltips" published on May 30, 2007, at http://www.walterzorn.de/en/tooltip/tooltip_e.htm.*

* cited by examiner

*Primary Examiner* — Cesar Paula
*Assistant Examiner* — Jian Huang
(74) *Attorney, Agent, or Firm* — Baker Botts L.L.P.

(57) ABSTRACT

A method for displaying notes includes receiving, from a server, a document comprising a plurality of notes, displaying the document, receiving a user input via an input device to position a cursor, determining a position of the cursor with respect to the document displayed at the user interface. Further, in response to determining that the cursor is positioned at a text line of the document, a method for requesting a note associated with the text line from the server, and formatting the note associated with the text line for display at the user interface when the cursor is positioned at the text line of the document.

17 Claims, 4 Drawing Sheets

METHOD AND SYSTEM FOR IMPLEMENTING DYNAMIC NOTE FORMATTING AND DISPLAY

BACKGROUND

The present disclosure relates generally to implementing dynamic note displays in a document.

BRIEF SUMMARY

The present disclosure relates generally to methods or systems for implementing note displays in a document.

According to an embodiment of the disclosure, a method comprising: receiving, from a server, a document comprising a plurality of notes; formatting the document for display at a user interface; receiving a user input generated from an input device that is operable to position a cursor at the user interface; and determining a position of the cursor with respect to the document displayed at the user interface. Further, in response to determining that the cursor is positioned at a text line of the document: requesting a note associated with the text line from the server; and formatting the note associated with the text line for display at the user interface when the cursor is positioned at the text line of the document.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
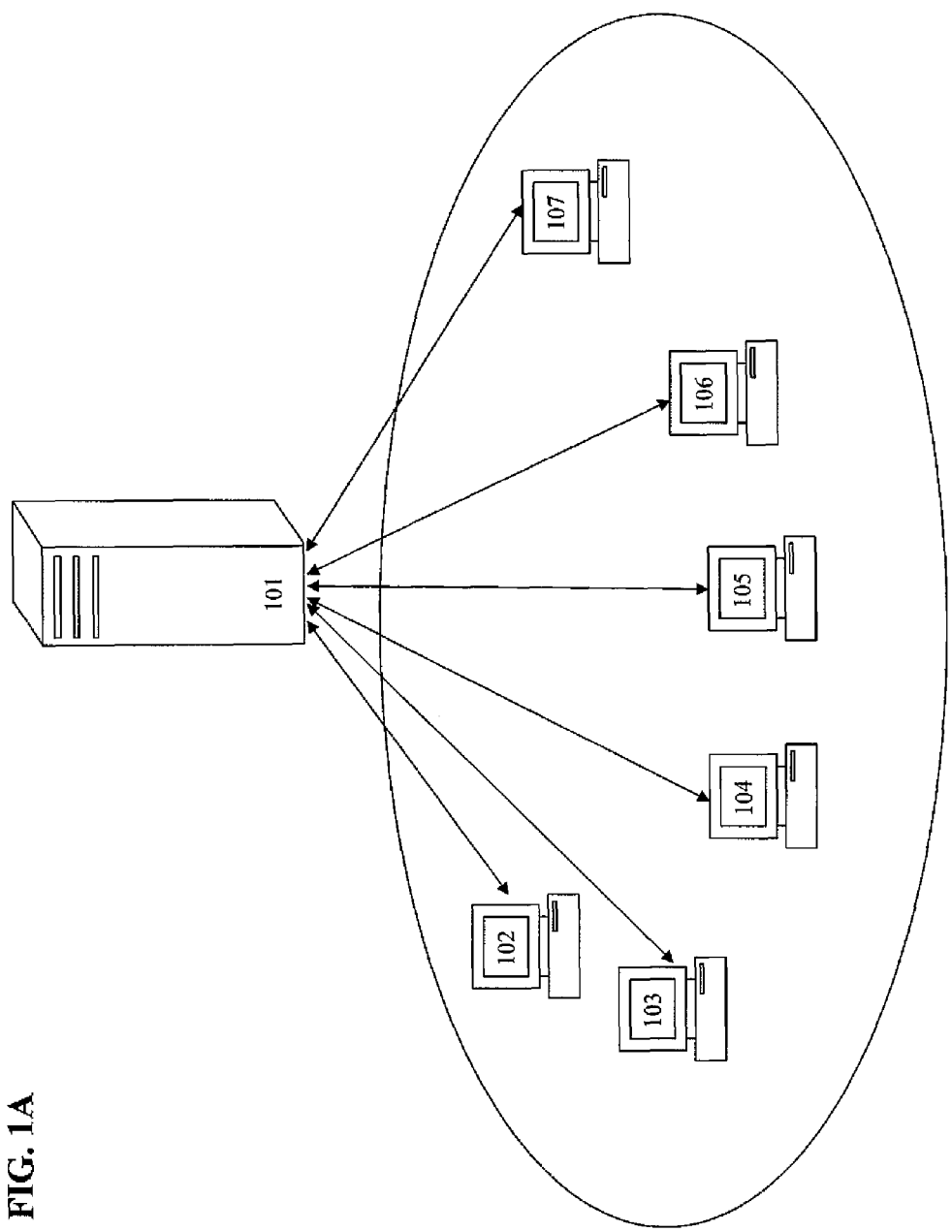
FIG. 1A is a diagram depicting a server connected to a plurality of display terminals according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1A, a dynamic note display system may include a server 101 and a plurality of display terminals 102-107. Display terminals 102-107 may be connected to server 101 via a network. Server 101 may store, send, and receive electronic files from devices connected to the network. For example, server 101 may store an electronic document including notes that provide additional information for particular portions, e.g., text lines, of the electronic document. Server 101 may store information in a database and may receive query requests to query the database to generate a report or a document. For example, server 101 may receive a query from display terminal 102 and generate a report based on the query received from display terminal 102. Server 101 may store the report and may provide the report to other display terminals 103-107. In another embodiment, server 101 may store electronic files in a data repository connected to server 101. For example, server 101 may store the electronic files in a database in the data repository and may retrieve the electronic files from the data repository when needed.

Server 101 may receive requests from display terminals 102-107 to add notes to respective parts, e.g., text lines, of a document stored in server 101. Server 101 may store and associate the notes received from display terminals 102-107 with corresponding parts of the document. When a display terminal requests a document stored in server 101, server 101 may send a copy of the document with corresponding notes to the requesting display terminal to be displayed by the requesting display terminal. The notes may be displayed in the margins of a document using small text or numbers. Nevertheless, the notes displayed in the margins of the document may not be seen easily. Further, when a number of notes increases in the document, the margins of the document may be crowded with these static notes that may be difficult for a user to read.

The present disclosure may provide a method or a system for implementing dynamic note displays. In particular, an indicator, e.g., an icon, may be provided for a text line to indicate whether a note is added for the text line. Further, rather than displaying all of the notes in the margins of the document, the dynamic notes for a particular text line may remain hidden until the particular text line is activated by a user interaction, e.g., mouse-over, at the particular text line of the displayed document. For example, when a cursor moves over the particular text line, a display area corresponding to the particular text line may be highlighted and a tool-tip box including notes associated with the particular text line may be displayed adjacent to the particular text line, e.g., a floating tool-tip box over the displayed document. In addition, server 101 may be a shared server storing a shared document or report including notes added from different terminal devices. Thus, the notes added from different terminal devices may be retrieved and displayed by each terminal devices. Accordingly, the present disclosure may provide dynamic notes that improve user experience and user collaboration.

Figure 1B:
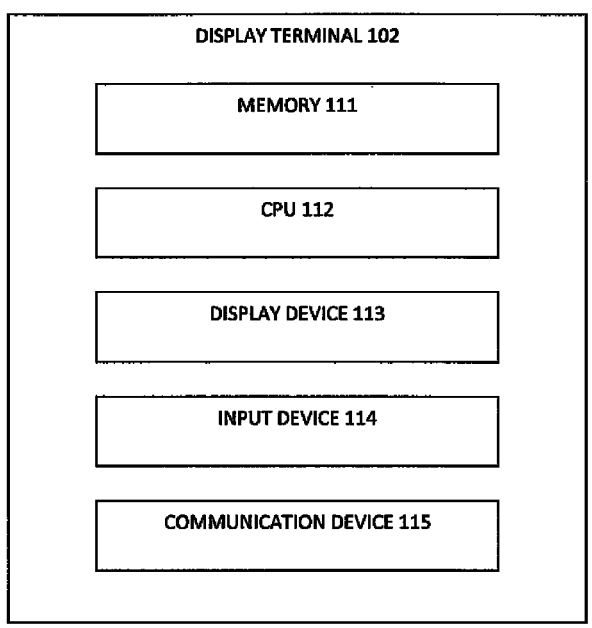
FIG. 1B is a schematic representation of a display terminal according to an embodiment of the disclosure.

Referring to FIG. 1B, display terminal 102 may include a memory 111 and a central processing unit ("CPU") 112. Memory 11 may store computer readable programs or instructions, that when executed by CPU 112, controls display terminal 102 to preform respective processes. For example, memory 111 may store computer readable programs for performing a dynamic note displaying process. Display terminal 102 may include a user interface, e.g., a display device 113, such as a computer screen, a touch screen, a projector, or the like. Display device 113 may receive instructions from CPU 112 to display various information, e.g., documents, graphs, or the like. Display terminal 102 may include an input device 114, e.g., a keyboard, a mouse, a touch screen, or the like, that may receive user inputs. Further, display terminal 102 may include a communication device 115 that may send and receive data from other devices by wired communication, e.g., Ethernet, USB cable, or the like, or wireless communication, e.g., WiFi, Bluetooth, cellular, or the like. CPU 112 may control and facilitate the operations of the aforementioned devices. Each of display terminals 103-107 may include similar components as display terminal 102.

Display terminal 102 may execute a document display process. For example, display terminal 102 may request and retrieve an electronic document from server 101. Display terminal 102 then may display the electronic document on display device 113. Display terminal 102 may allow a user to view and modify the displayed electronic document. For example, display terminal 102 may receive user instructions via input device 114 to add notes to a particular part of the electronic document. Various notes included with the electronic document may be displayed. Modification made by the user may be saved and sent to server 101 to be stored by server 101. Thus, notes and modification made by a group of users may be shared among the group.

Figure 2:
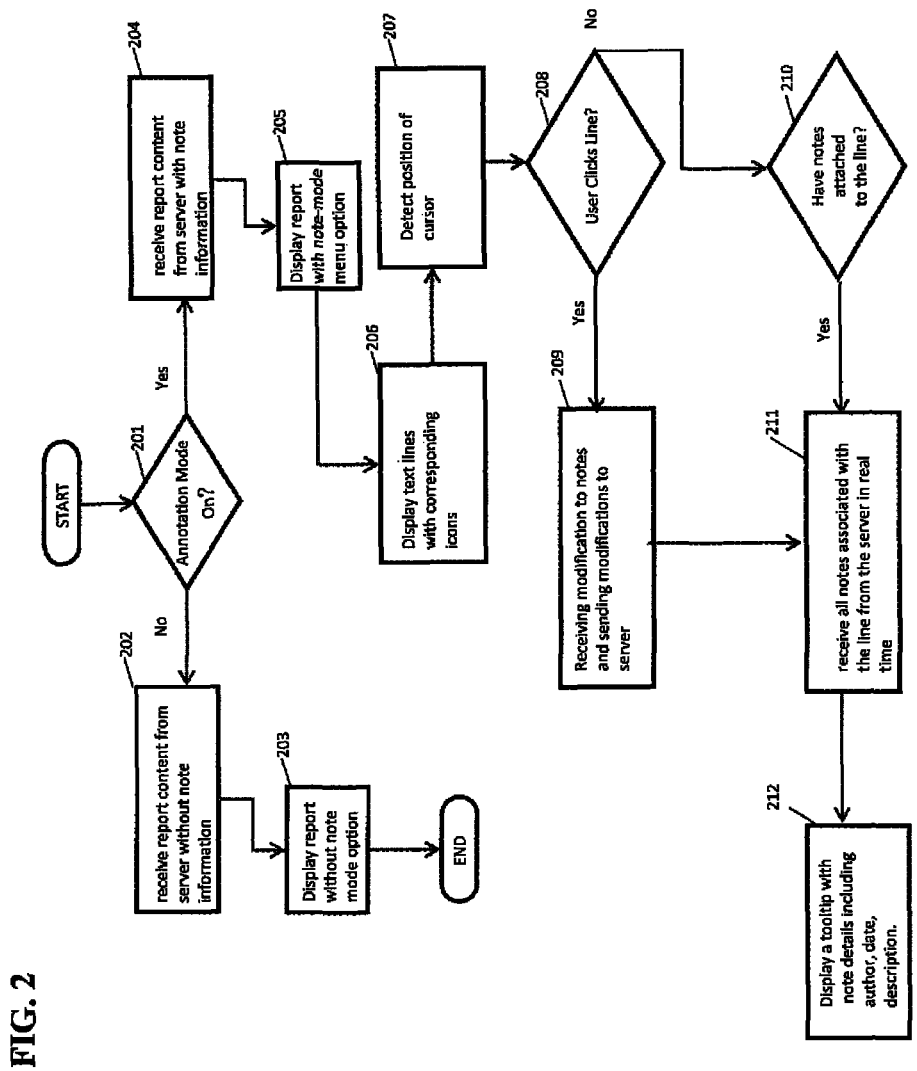
FIG. 2 is a flowchart depicting a method for implementing dynamic note displays in a display terminal according to an embodiment of the disclosure.

Referring to FIG. 2, a dynamic note displaying process may be executed by one of display terminals 102-107. For example, the dynamic note displaying process may be executed by CPU 112 of display terminal 102. At step 201, CPU 112 may determine whether an annotation mode is ON. Memory 111 may include a portion designated for storing a status, e.g., ON or OFF, of the annotation mode. A user operating a display terminal may select the annotation mode by inputting the annotation mode selection via input device 114. When the annotation mode is ON, the dynamic note display may be activated. When the annotation mode is OFF, the dynamic note display may be de-activated. When the annotation mode is OFF, CPU 112 may instruct communication device 115 to send a request to server 101 to fetch a document, e.g., a report content, without fetching note information at step 202. At step 203, CPU 112 may control display device 113 to display the document received from server 101, without displaying note information.

Figure 3:
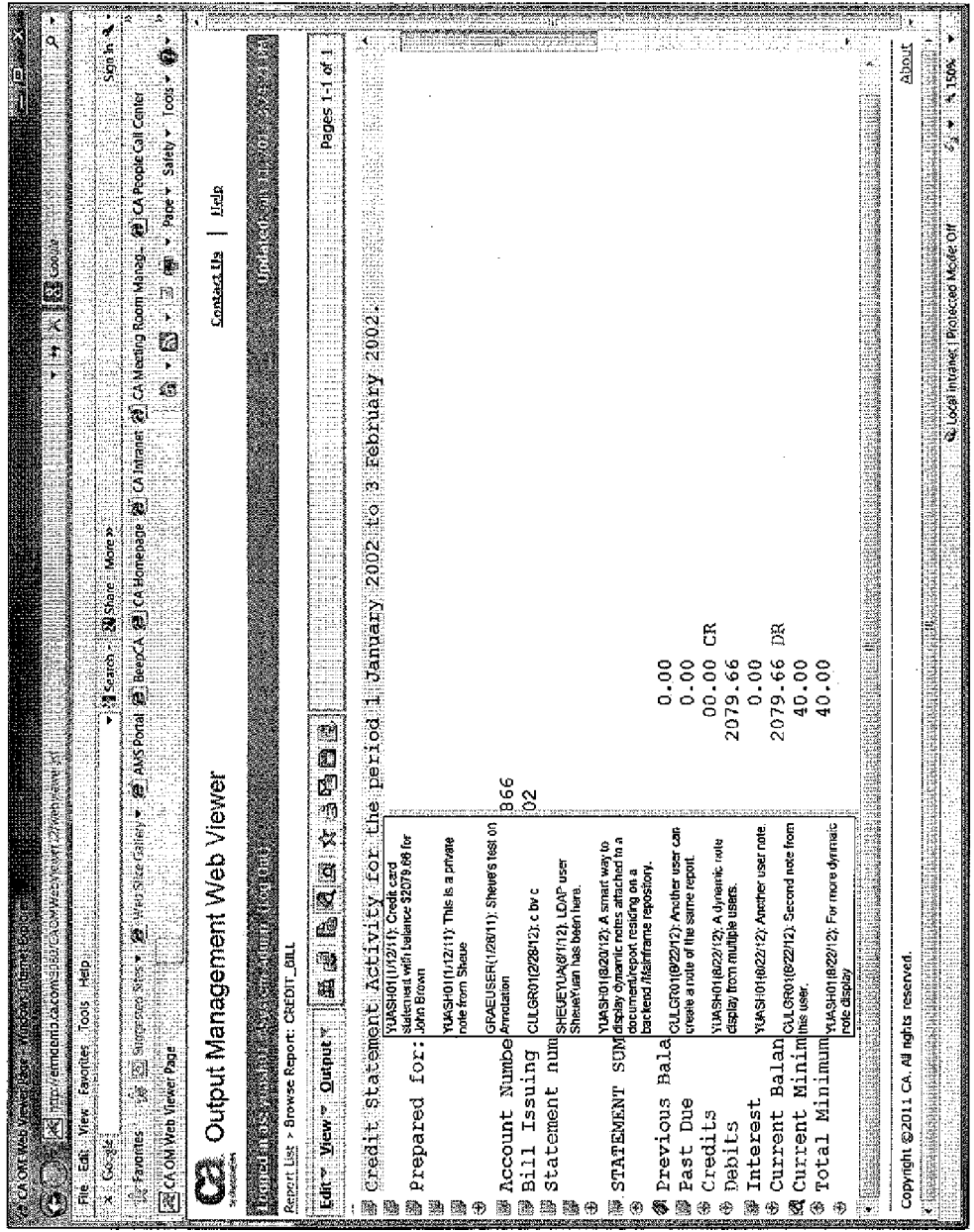
FIG. 3 is a screenshot of a display displaying a dynamic note according to an embodiment of the disclosure.

When the annotation mode is ON, CPU 112 may instruct communication device 115 to send a request to server 101 to fetch a document, e.g., a report, including corresponding note information at step 204. At step 205, CPU 112 may control display device 113 to display the document received from server 101 along with a note-mode menu. As shown in FIG. 3, a document "Credit Statement Activity for the period 1 Jan. 2002 to 3 Feb. 2002" is displayed as an exemplary document. A tool bar including "Edit," "View," and "Output" is displayed along a top portion of the document. When activated, the "Edit" button may receive user instructions for various editing operations, such as "Find", "Go To Page", and the like. The "Find" operation may receive certain search strings or words by which CPU 112 may search the document. The "Go To Page" operation may receive user instructions for display terminal 102 to display a selected page of a document. When activated, the "View" button may receive user instructions for viewing operations, such as "Report Information", "Annotations", and "Annotation List". The "Report Information" operation may receive user instructions for viewing the report information of the document. The "Annotations" operation may receive user instructions for viewing the annotations of the document. The "Annotation List" operation may receive user instructions for viewing a list of the annotations of the document. When activated, the "Output" button may receive user instructions for various outputting operations, such as "Email", "Print", and "Export". The "Email" operation may receive user instructions for emailing the document. The "Print" operation may receive user instructions for printing the document. The "Export" operation may receive user instructions for exporting the document to various file formats, e.g., MICROSOFT EXCEL spreadsheet format.

At step 206, CPU 112 may control display device 113 to display an icon corresponding to each text line of the document. Referring to a left side portion of the displayed document in FIG. 3, an icon may be displayed at the beginning of each text line. The icon may indicate an annotation property of the corresponding text line. For example, an icon with a sticky note image may indicate that a note or an annotation is associated with the text line. An icon with a plus sign image may indicate that no notes or annotations are associated with the text line, but a note or annotation may be added to the text line.

At step 207, the CPU 112 may detect a position of the cursor in the displayed document based on the user input received at input device 114. For example, input device 114 may be a mouse, a keyboard, a touch screen, or the like, that may receive a user input to position or move a cursor in the displayed document. CPU 112 may detect a position of the cursor in the document based on the input received at input device 114. For example, CPU 112 may determine at which text line the cursor is positioned. CPU 112 may control display device 113 to highlight the text line at which the cursor is positioned. For example, as shown in FIG. 3, the cursor may be positioned at the first line and a background of the first text line may be highlighted to have a different color from that of the background of the other text lines.

At step 208, the CPU 112 may determine whether a mouse-click, e.g., an activation, has occurred at the cursor. For example, if input device 114 is a computer mouse, the CPU 112 may determine whether a button of the computer mouse has been clicked. If a mouse-click event occurs at the cursor, the notes associated with the text line at which the mouse-click event occurs may be modified at step 209. For example, CPU 112 may control display device 113 to display the notes associated with the text line at which mouse-click even occurred. The notes may be displayed in an input field in which the notes may be modified by a user. For example, a user may use a keyboard to add, delete, or edit certain notes displayed in the input field. CPU 112 may control communication device 115 to send the modifications to the notes to server 101. Thus, the notes of the document, which have been modified, may be updated and stored at server 101. At step 211, CPU 112 may control communication device 115 to send a request to server 101 requesting for all notes associated with the text line stored at server 101. CPU 112 may control communication device 115 to receive the notes associated with the text line from server 101 at step 211.

If mouse-click did not occur, e.g., no activation, at the cursor at step 208, the CPU 112 may determine whether there are notes associated with the text line at which the cursor is positioned at step 210. If there are notes associated with the text line at which the cursor is positioned, CPU 112 may control communication device 115 to send a request to server 101 requesting for all notes associated with the text line stored at server 101. CPU 112 may control communication device 115 to receive the notes associated with the text line from server 101 at step 211.

At step 212, the CPU may control display device 113 to display the notes in a tooltip box adjacent to the text line. As shown in FIG. 3, the tool-tip box may be positioned below the text line at which the cursor is positioned and may hover over the other text lines. The tooltip box may include notes added by other users from other display terminals. For example, each note may include the identification of the user, the date when the note was added, and the description of the note. Because the notes are updated at step 211, the notes may reflect updated additions or modification made by the other users. Thus, the notes may continuously be updated in real time. The tooltip box may move horizontally following a horizontal movement of the cursor as indicated by input device 114. Thus, tooltip box may be moved to reveal relevant portion of the document.

After step 212, the dynamic note displaying process may return to step 207, in which CPU 112 may continue to detect a position of the cursor. When the cursor moves away from a text line, CPU 112 may control display device 113 to stop displaying the notes associated with the text line. Thus, notes that are associated with text lines, which are not activated by the cursor, may remain hidden. Therefore, these hidden notes may not crowd the document and the user experience may be improved.

Accordingly, by implementing the dynamic note displaying process, display terminal may provide improved user experience by displaying the notes associated with a text line in which the cursor is positioned. Further, notes added by other users using other display terminals may be updated and displayed in real time to improve user collaboration.

In another embodiment, the dynamic note display process may be executed by server 101. Server 101 may receive user instructions from display terminals 102-107. Based on the user instructions, server 101 may send display data to respective terminals 102-107 to be displayed. Thus, server 101 may execute various processing in the dynamic note display process and the display terminals 102-107 may receive user instructions and display the display data received from server 101.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   receiving, from a server, a document comprising a plurality of user-added notes, wherein the document is shared between a plurality of users;
   formatting the document for display at a user interface;
   receiving a new user-added note from another device after the document comprising the plurality of user-added notes is displayed at the user interface;
   adding the new user-added note to the plurality of user-added notes in the document in real-time;
   receiving a user input generated from an input device that is operable to position a cursor at the user interface;
   determining a position of the cursor with respect to the document displayed at the user interface; and
   in response to determining that the cursor is positioned at a text line of the plurality of text lines of the document:
      highlighting the text line;
      requesting a plurality of user-added notes associated with the text line from the server;
      formatting a tooltip box for display at the user interface when the cursor is positioned at the text line of the document, wherein the tooltip box is positioned adjacent to the text line at which the cursor is positioned; and
      formatting the plurality of user-added notes associated with the text line for display in the tooltip box when the cursor is positioned at the text line of the document, wherein the plurality of displayed user-added notes includes the new user-added note added after the document was initially displayed at the user interface, and wherein the plurality of user-added notes comprises a note added by a first user and a note added by a second user;
   storing the plurality of user-added notes comprising the document in a database;
   receiving a query requesting a first user-added note of the plurality of user-added notes comprising the document be retrieved from the database;
   retrieving the first user-added note from the database; and
   generating a report including the first user-added note based on the query.

2. The method according to claim 1, further comprising:
   in response to determining that the cursor is positioned at the text line but has not clicked on the text line, changing a background color of the text line.

3. The method according to claim 1, further comprising automatically formatting the tooltip box for display at the text line at which the cursor is positioned.

4. The method according to claim 1, further comprising:
   storing the generated report; and
   transmitting the generated report to the plurality of users.

5. The method according to claim 1 further comprising:
   in response to receiving an indication that no user-added notes are associated with the text line from the server, formatting a plus sign image for display at the text line, the plus sign indicating that a note can be added to the text line.

6. The method according to claim 1, further comprising:
   in response to the cursor moving away from the text line, hiding the plurality of user-added notes associated with the text line.

7. The method according to claim 1, further comprising:
   receiving a modification to a user-added note of the plurality of user-added notes in the document from another device after the document is displayed at the user interface;
   modifying the user-added note in real-time; and
   in response to determining that the cursor is positioned at a text line of the plurality of text lines of the document, formatting the plurality of user-added notes associated with the text line for display at the user interface when the cursor is positioned at the text line of the document, wherein the plurality of displayed user-added notes includes the modified user-added note added after the document was initially displayed at the user interface.

8. A system comprising:
   a processor; and
   a computer-readable storage medium storing computer-readable instructions, which when executed by the processor, cause the processor to perform:
      receiving, from a server, a document comprising a plurality of user-added notes, wherein the document is shared between a plurality of users;
      formatting the document for display at a user interface;
      receiving a new user-added note from another device after the document comprising the plurality of user-added notes is displayed at the user interface;
      adding the new user-added note to the plurality of user-added notes in the document in real-time;
      receiving a user input generated from an input device that is operable to position a cursor at the user interface;
      determining a position of the cursor with respect to the document displayed at the user interface;
      in response to determining that the cursor is positioned at a text line of the document:
         highlighting the text line;

requesting a plurality of user-added notes associated with the text line from the server;

formatting a tooltip box for display at the user interface when the cursor is positioned at the text line of the document, wherein the tooltip box is positioned adjacent to the text line at which the cursor is positioned; and formatting the plurality of user-added notes associated with the text line for display in the tooltip box when the cursor is positioned at the text line of the document, wherein the plurality of displayed user-added notes includes the new user-added note added after the document was initially displayed at the user interface, and wherein the plurality of user-added notes comprises a note added by a first user and a note added by a second user;

storing the plurality of user-added notes comprising the document in a database;

receiving a query requesting a first user-added note of the plurality of notes comprising the document be retrieved from the database;

retrieving the first user-added note from the database; and generating a report including the first user-added note based on the query.

9. The system according to claim 8, further comprising automatically formatting the tooltip box for display at the text line at which the cursor is positioned.

10. The system according to claim 8, wherein the computer-readable instructions further cause the processor to perform:

storing the generated report; and transmitting the generated report to the plurality of users.

11. The system according to claim 8, the computer-readable instructions, which when executed by the processor, cause the processor to further perform in response to receiving an indication that no user-added notes are associated with the text line from the server, formatting a plus sign image for display at the text line, the plus sign indicating that a note can be added to the text line.

12. The system according to claim 8, the computer-readable instructions, which when executed by the processor, cause the processor to further perform:

in response to the cursor moving away from the text line, hiding the plurality of user-added notes associated with the text line.

13. The system according to claim 8, wherein the computer-readable instructions further cause the processor to perform:

receiving a modification to a user-added note of the plurality of user-added notes in the document from another device after the document is displayed at the user interface;

modifying the user-added note in real-time;

in response to determining that the cursor is positioned at a text line of the plurality of text lines of the document, formatting the plurality of user-added notes associated with the text line for display at the user interface when the cursor is positioned at the text line of the document, wherein the plurality of displayed user-added notes includes the modified user-added note added after the document was initially displayed at the user interface.

14. A computer program product comprising:

a non-transitory computer readable storage medium having computer readable program code embodied therewith, the computer readable program code comprising:

computer readable program code configured to receive, from a server, a document comprising a plurality of user-added notes, wherein the document is shared between a plurality of users;

computer readable program code configured to format the document for display at a user interface;

computer readable program code configured to receive a new user-added note from another device after the document comprising the plurality of user-added notes is displayed at the user interface;

computer readable program code configured to add the new user-added note to the plurality of user-added notes in the document in real-time;

computer readable program code configured to receive a user input generated from an input device that is operable to position a cursor at the user interface;

computer readable program code configured to determine a position of the cursor with respect to the document displayed at the user interface;

computer readable program code configured to, in response to determining that the cursor is positioned at a text line of the plurality of text lines of the document:

highlighting the text line;

request a plurality of user-added notes associated with the text line from the server;

format a tooltip box for display at the user interface when the cursor is positioned at the text line of the document, wherein the tooltip box is positioned adjacent to the text line at which the cursor is positioned; and format the plurality of user-added notes associated with the text line for display in the tooltip box when the cursor is positioned at the text line of the document, wherein the plurality of displayed user-added notes includes the new user-added note added after the document was initially displayed at the user interface, and wherein the plurality of user-added notes comprises a note added by a first user and a note added by a second user;

computer readable program code configured to store the plurality of user-added notes comprising the document in a database;

computer readable program code configured to receive a query requesting a first user-added note of the plurality of notes comprising the document be retrieved from the database;

computer readable program code configured to retrieve the first user-added note from the database; and computer readable program code configured to generate a report including the first user-added note based on the query.

15. The method according to claim 1, further comprising:

receiving an indication that a first user would like a list of the plurality of user-added notes associated with the document to be displayed;

in response to receiving the indication that the first user would like the list of the plurality of user-added notes to be displayed, formatting the list comprising the plurality of user-added notes associated with the document for display to the first user.

16. The system according to claim 8, wherein the computer-readable instructions further cause the processor to perform:

receiving an indication that a first user would like a list of the plurality of user-added notes associated with the document to be displayed;

in response to receiving the indication that the first user would like the list of the plurality of user-added notes to be displayed, formatting the list comprising the plurality of user-added notes associated with the document for display to the first user.

17. The system according to claim 8, wherein the computer-readable instructions further cause the processor to perform:
in response to determining that the cursor is positioned at the text line but has not clicked on the text line, changing a background color of the text line.

\* \* \* \* \*